Feb. 17, 1953     C. PARSONS     2,628,819
SCREEN ARRANGEMENT FOR USE IN CONJUNCTION
WITH OIL WELL DRILLING TURBINES

Filed Nov. 22, 1949     2 SHEETS—SHEET 1

INVENTOR.
Critchell Parsons
BY
Bailey, Stephens & Huettig
ATTORNEYS

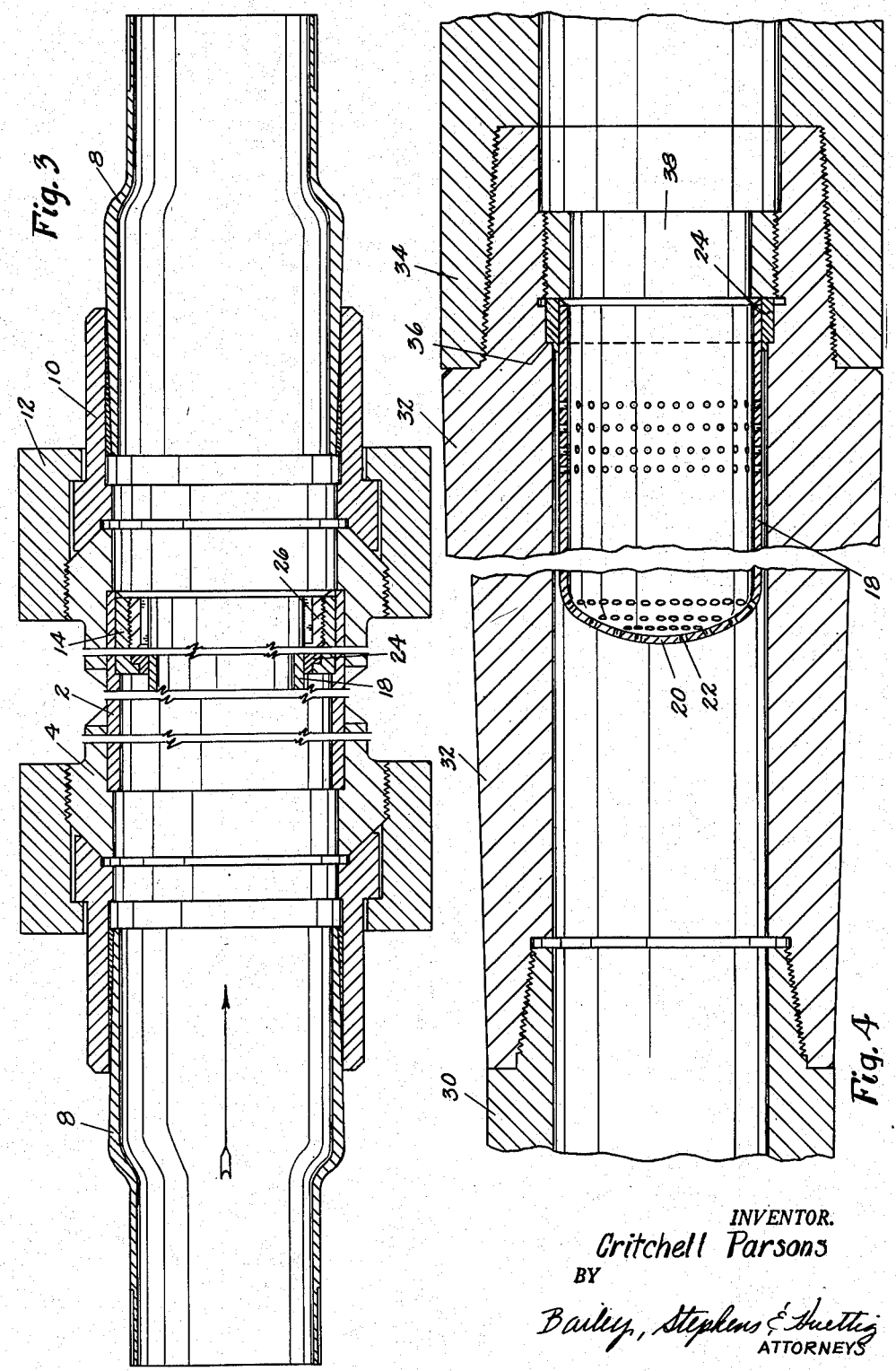

Patented Feb. 17, 1953

2,628,819

UNITED STATES PATENT OFFICE 2,628,819

SCREEN ARRANGEMENT FOR USE IN CONJUNCTION WITH OIL WELL DRILLING TURBINES

Critchell Parsons, Silver Spring, Md., assignor to The Engineering Development Company, Incorporated, a corporation of Texas Application November 22, 1949, Serial No. 128,852

3 Claims. (Cl. 255—4)

The invention relates to oil well drilling, and more especially to a screen arrangement for use in connection with turbine operated oil well drilling equipment.

In the application of George P. Wagner, S. N. 729,613, filed February 19, 1947, there is described an oil well drilling turbine which is to be attached to the bottom of a drill stem and to be driven by the drilling mud pumped downwardly through the stem. It has been found that grit and small pieces of rock formed during the drilling, and carried up by the drilling mud, are not always adequately removed in the settling tanks. Such pieces are undesirable, since they have a tendency to catch between the turbine blades and thus to wear or break these blades, reducing the efficiency of the turbine and eventually requiring replacement of the blades.

The primary object of the present invention is to provide a screen for eliminating all pieces above a predetermined size from the drilling mud.

Another object of the invention is to locate such a screen in a place where it will operate with greatest efficiency, this location being at a point between the slush pump which furnishes the drilling mud to the well and the turbine.

Still another object of the invention is to provide a screen which is interchangeable, for use at two different points in the mud line.

A further object of the invention is to provide a screen which can be readily and quickly removed and replaced, so that the screen can be cleaned out at suitable intervals without substantially retarding the drilling operation. More especially, the invention contemplates the provision of a quick detachable pipe section between the pump and the well, the screen being mounted in this pipe section.

Still a further object of the invention is to provide a screen which is sufficiently rigid to withstand the high pressures of the drilling mud exerted on it during pumping of the mud through the well. The invention contemplates the provision of a screen in the form of a thimble having its open end pointing in the direction of mud flow from the pump, this screen being arranged within but spaced from a pipe section so as to leave a space therebetween in which the particles stopped by the screen can collect between cleanings.

An additional object of the invention is to provide a pipe section containing such a screen which is mounted in a horizontal position, so that the bulk of the material intercepted by the screen collects along the bottom of the pipe.

Further objects and advantages of the invention will appear more fully from the following description, especially when taken in conjunction with the accompanying drawings which form a part thereof.

In the drawings:

Fig. 3 is a cross-section showing the mounting of the pipe section of Fig. 1 in a mud line;

Fig. 4 shows the mounting of a screen above an oil well drilling turbine; and

Figure 1:
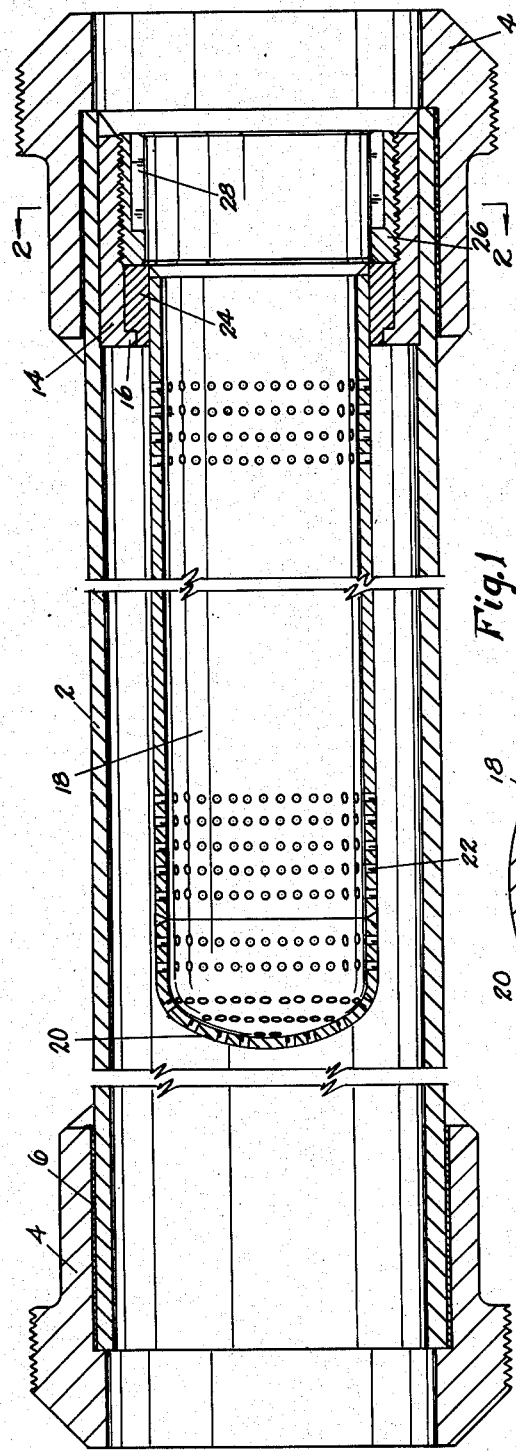
Fig. 1 is a cross-section through a pipe section carrying a screen embodying my invention.
Figure 2:
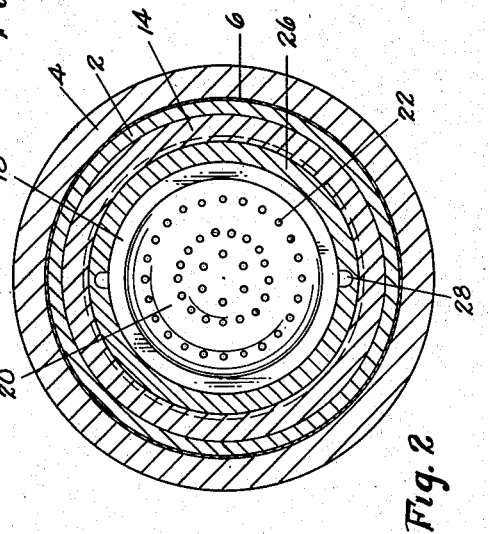
Fig. 2 is a cross-section on the line 2—2 of Fig. 1.

In Figs. 1 to 3, 2 is a pipe section having threaded coupling members 4 welded on its ends, as at 6. This section is arranged in the pipe line between two pipe sections 8 having on their ends shouldered members 10 for engagement by lock nuts 12 threadedly engageable with coupling members 4 (see Fig. 3).

Within pipe section 2 is secured, as by welding, a sleeve 14. This sleeve has at its inner end an internal shoulder formed by a flange 16, and most of the remainder of the sleeve is internally threaded. The screen is in the form of a thimble, having a cylindrical portion 18 and a closed end formed by dome-shaped part 20. Over most of its area, except near its open end, the screen is provided with perforations 22 of suitable size. Welded on the outside of the open end of portion 18 is a colar 24.

Collar 24 slides into sleeve 14 and abuts against shoulder 16. It is held in position by a ring 26 threaded in sleeve 14 until it engages collar 24. This ring has grooves 28 for engagement by a suitable tool. The outer diameter of screen part 18 is less than the inner diameter of pipe section 2, so as to leave a space between them.

The same screen can be used interchangeably just above the turbine drill, as shown in Fig. 4. On the bottom end of the drill stem 30 is threaded an adapter section 32, on which in turn is threaded the turbine drill sleeve 34. Adapter 32 has at its lower end an internal shoulder 36, and below this shoulder is internally threaded to receive a holding nut 38. The screen is of somewhat less outer diameter than the inside diameter of adapter 32, so as to provide a space around the screen. The collar 24 engages shoulder 36, and the screen is firmly held by nut 38.

Figure 5:
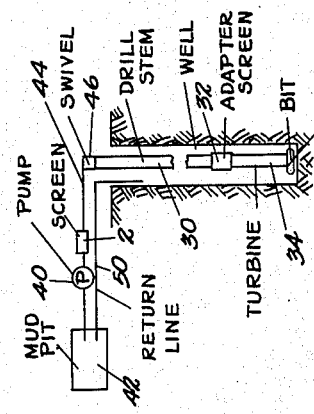
Fig. 5 is a diagrammatic showing of an oil well drilling system utilizing such screens.

Fig. 5 shows an oil-well drilling unit utilizing two such screens, although within the broader aspects of the invention the use of both screens simultaneously is not essential. Pump 40 draws the mud from mud pit 42 into pipe line 44. Pipe section 2 is arranged in this line, on the downstream or outlet side of the pump, with the closed end 20 of the screen pointing towards the pump. Pipe section 2 is preferably arranged in a horizontal position. The mud passes through swivel 46 into drill stem 30, then through adapter 32 (which may also hold a screen, as shown in Fig. 4) to the turbine 34. This turbine drives a bit 48. The mud returns up through the well outside the drill stem and by return line 50 to the mud pit 42. After suitable settling and other treatment, the mud is re-used, by being pumped again and again through the drill stem.

In practice, it is desirable to have two or more pipe sections 2 available, each equipped with a screen. At suitable intervals, when the rig is shut down, nuts 12 are released and a clean pipe section 2 substituted for the one which has been in use. The removed section can then be cleaned out in any suitable manner at the convenience of the operator. The adapter 32 may likewise be removed and the screen cleared whenever the drill string and turbine are taken out of the well. However, when a screen is used in the pump line, cleaning of the adapter screen is only necessary at long intervals since comparatively few particles of sufficient size to be intercepted will reach it.

In both forms, the particles will collect in the space between the screen and the surrounding wall, at points so that they leave most of the openings 22 unobstructed. Best results are obtained when the screen is horiozntal, as shown in Fig. 1, the particles then falling to the bottom part of the pipe and leaving the remainder of the screen circumference clear.

Because of its shape, the screen will resist high mud pressures, yet it is easy and inexpensive to manufacture. Replacement of screens merely requires removal of nuts 26 or 38, so that repairs are simple.

While I have described herein some embodiments of my invention, I wish it to be understood that I do not intend to limit myself thereby except within the scope of the claims hereto or hereinafter appended.

I claim:

1. In a turbine operated oil well drilling unit including a drill string, a turbine at the lower end of said drill string, a bit driven by said turbine, a pump, and means to conduct drilling mud from said pump to said drill string, a screen between the pump and the turbine comprising a thimble-shaped piece of less external diameter than the internal diameter of the surrounding part of said unit and having its open end pointing in the direction of flow of mud therethrough said piece having perforations in its side and end walls.

2. In a turbine operated oil well drilling unit including a drill string, a turbine at the lower end of said drill string, a bit driven by said turbine, a pump, and means to conduct drilling mud from said pump to said drill string, said means including a horizontal pipe section, a screen secured in said pipe section and comprising a thimble-shaped piece of less external diameter than the internal diameter of said pipe section and having its open end pointing in the direction of flow of mud through the section, said piece having perforations in its side and end walls.

3. In a turbine operated oil well drilling unit including a drill string, a turbine at the lower end of said drill string, a bit driven by said turbine, a pump, and means to conduct drilling mud from said pump to said drill string, said means including a horizontal pipe section, a screen secured in said pipe section and comprising a thimble-shaped piece of less external diameter than the internal diameter of said pipe section and having its open end pointing in the direction of flow of mud through the section, said piece having perforations in its side and end walls, said pipe section having an internal shoulder therein and having internal threads adjacent said shoulder on the downstream side thereof, said piece having a ring on its outer wall adjacent its open end engageable with said shoulder, and a ring nut engaged with said threads and holding said ring against said shoulder.

CRITCHELL PARSONS.

REFERENCES CITED

The following references are of record in the file of this patent:

UNITED STATES PATENTS

| Number | Name | Date |
|---|---|---|
| 1,356,547 | Mueller | Oct. 26, 1920 |
| 1,730,578 | Lawaczeck | Oct. 8, 1929 |
| 2,042,921 | Arvintz | June 2, 1936 |
| 2,056,471 | Krall | Oct. 6, 1936 |
| 2,068,837 | Aronson | Jan. 26, 1937 |
| 2,078,543 | Salisbury | Apr. 27, 1937 |
| 2,265,550 | Smith | Dec. 9, 1941 |
| 2,304,492 | Aue et al. | Dec. 8, 1942 |
| 2,418,247 | Dalzell | Apr. 1, 1947 |
| 2,530,283 | Brown | Nov. 14, 1950 |
| 2,540,564 | Zacko | Feb. 6, 1951 |
| 2,571,059 | Puschelberg et al. | Oct. 9, 1951 |